June 19, 1928.
A. J. WEATHERHEAD, JR
1,674,076
COCK AND FAUCET
Filed Oct. 27, 1925
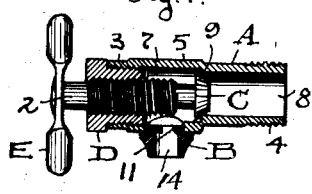
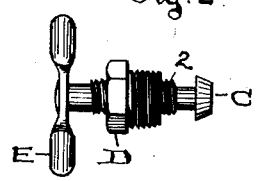
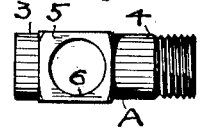
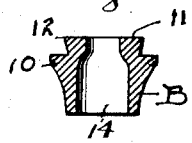
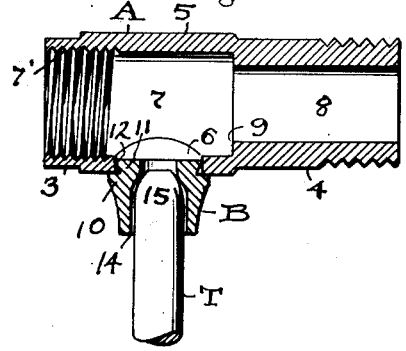
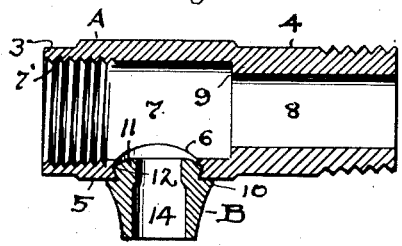
Inventor
A.J. WEATHERHEAD JR.
By *Fisher, Meier & Moon*, Attorney Patented June 19, 1928.

1,674,076

UNITED STATES PATENT OFFICE.

ALBERT J. WEATHERHEAD, JR., OF CLEVELAND, OHIO.

COCK AND FAUCET.

Application filed October 27, 1926. Serial No. 144,625.

My invention pertains to an improvement in cocks and faucets, my object in general being to provide a simple assembly of parts, each of which may be produced quickly and cheaply in and by automatic screw-machines, and the several parts being particularly constructed to simplify production and the assembly thereof. As constructed the cock or faucet is especially suitable for connection with gasoline receptacles or tanks in which a supply of liquid of any kind is stored, or in which a drain cock is required, and its mode of construction permits the device to be made relatively small or of diminutive size.

In the accompanying drawing, Fig. 1 is a sectional view of a cock or faucet constructed according to my invention; Fig. 2 a side elevation of the valve stem and handle and the nut for supporting the stem; Fig. 3 a side view partly in section of the handle; Fig. 4 a side view of the nut; Fig. 5 a side view partly in section of the valve stem member; Fig. 6 an elevation of the valve body without its spout; Fig. 7 is a side view of the spout member as it appears before it is united with the body member and Fig. 8 is a sectional view of the spout member alone. Fig. 9 is an enlarged sectional view of the spout member inserted within the side of the body member and showing an expanding tool introduced within the spout. Fig. 10 is a sectional view of the spout and body permanently united together.

The cock or faucet embodying the invention, comprises five parts only,—a body A, a separate spout B fixed to the body, a valve member C, a nut D, and a handle E affixed to the outer end of the screw-threaded stem 2 of valve member C. Body A is cut to a given length from a square rod and then this square piece of stock is slightly reduced at its opposite ends to provide round extensions 3 and 4 of different length, the longer extension 4 being screw-threaded. The middle portion 5 of body A is left square or flat sided, and a round opening 6 is drilled into one of its flat faces to communicate with the larger bore 7 which is drilled axially through extension 3 and the enlarged middle portion 5. A round bore 8 of reduced diameter extends through the longer screw-threaded extension 4 and bore 8 provides an intake passage for the cock or valve. The differences in diameter in the co-axial bores 7 and 8 provide a right-angled shoulder and sharp-edged valve seat 9 for beveled valve member C at one side of discharge opening 6, and the screw-threaded stem 2 of said valve member passes through an axial screw-threaded opening in nut D, said nut being externally threaded to connect with the internal threads 7' within the entrance of larger bore 7. Body A, spout B, valve member C, and nut D, are separately produced by automatic screw-machine operations, and handle E by screw-machine and punch press operations. Valve member C, nut D, and handle E are then assembled, the nut being screwed upon the valve stem, and handle E being affixed to the outer end of the valve stem by an upsetting or spinning operation. When assembled as shown in Fig. 2 these three parts provide one unit, and body A and spout B another unit, the spout B being rigidly united to body A by a simple expanding operation and the spout being particularly constructed to effect a tight locking connection with the body. Thus, spout B is a cylindrical section of any desired length having an annular enlargement 10 which provides a flat shoulder adapted to be seated against the flat side of body A, the said spout member also having a short outwardly-flaring extension or neck 11 which is adapted to project into round opening 6 with the sharp corner edge 12 thereof in engaging position opposite the straight wall of said opening 6, see Fig. 9. Passage 14, which extends through the spout member, is reduced in diameter where it passes through neck 11, thus providing surplus stock at that point which may be engaged by the rounded or tapered end 15 of an expanding tool T and crowded outward as pressure is applied to the tool. In this operation the overhanging corner 12 is forced into locking engagement with, and embedded within, the wall of opening 6 and neck 11 is slightly elongated and altered in form. The original entrance to passage 14 is thereby enlarged in diameter to approximately the same diameter as the longer part of the passage, and the spout member is thereby so strongly and closely united to the body that it appears to be an integral part of the body. Moreover an exceptionally strong union for tubular piece B is obtained by localizing the expanding forces at the extreme inner end of neck 11 opposite the overhanging corner or larger part 12 apart from the flat shoulder or enlargement 10 on piece B. In that connection I have discovered that when a tighter fit is made at the shoulder than at the end of the neck that piece B may be knocked loose more readily than when an undercut is made in the neck.

A cock or faucet constructed as described may be produced very rapidly and cheaply; it may be readily made in very small sizes; it may be made entirely of rolled or drawn stock; and each part may be made in large numbers to accurate dimensions in an automatic screw-machine so that the assembly of the parts may be expedited and accurate fitting and a reliable operation obtained.

What I claim, is:

1. A cock of faucet, comprising a main body member cut to a predetermined length from flat sided rod stock and turned round and screw-threaded at one end, said member being drilled axially its full length with a bore having portions of different diameters and containing a valve seat and also drilled through one flat side at one side of said valve seat, the outer end of the bore of larger diameter being screw-threaded; a nut within said outer screw-threaded end of the bore; a valve member adapted to engage said valve seat, having a screw-threaded stem, extending through said nut; a handle united to the outer end of said stem; and a spout member having a flaring neck extending into the side opening in said body member and expanded into locking union with the side wall thereof.

2. A cock or faucet, comprising a main body having an axial bore and a round opening in its side open to said bore, and a separate spout member having a flaring neck with a sharp corner edge, the stock in said neck being expanded outwardly and the sharp edge being embedded within the wall surrounding said round opening.

3. A cock or faucet, comprising a main body having an opening, and a separate tubular piece having an undercut neck portion expanded tightly within said opening.

4. A cock or faucet, comprising a body member made of flat sided rod stock, a screw-threaded valve member made of cylindrical rod stock, a screw-threaded nut made of rod stock for receiving said valve member, and a handle for said valve member made of rod stock.

5. A cock or faucet, comprising a body member made of a flat sided rod reduced and turned round at its ends and drilled axially to different diameters to provide a valve seat with a sharp angular seating edge, a valve member made of rod stock having a beveled head to engage said sharp seating edge and formed with a stem of reduced diameter having a portion of its length screw-threaded, a nut having a screw-threaded axial opening to receive said stem, and a handle united to the outer end of said stem.

6. A cock or faucet, comprising a body member, a valve member, a screw nut and a handle, each made of cylindrical rod stock, the body member having co-axial bores of different diameters and a side opening, the valve member having a screw-threaded stem with a bored extremity, the nut having a screw-threaded axial opening for said stem and being screw-connected with one end of said body member, and the bored extremity of the stem being projected through the central part of the handle and expanded into rigid locking union therewith.

In testimony whereof I affix my signature.

ALBERT J. WEATHERHEAD, Jr.